United States Patent
Taniguchi et al.

(10) Patent No.: US 6,222,183 B1
(45) Date of Patent: Apr. 24, 2001

(54) OPTICAL ENCODER

(75) Inventors: Mitsuyuki Taniguchi; Masato Aochi, both of Gotenba (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/225,516

(22) Filed: Jan. 6, 1999

(30) Foreign Application Priority Data

Jan. 7, 1998 (JP) .................................................. 10-011979

(51) Int. Cl.[7] ...................................................... G01D 5/34
(52) U.S. Cl. ........................................ 250/231.13; 341/13
(58) Field of Search ........................ 250/231.13, 231.14, 250/231.15, 231.16, 231.17, 231.18; 33/707; 341/11, 13, 31

(56) References Cited

U.S. PATENT DOCUMENTS 4,536,650 * 8/1985 Carena et al. ................... 250/231.14
5,124,548 * 6/1992 Igaki ................................ 250/231.16
5,153,437 * 10/1992 Nishii et al. ..................... 250/231.14

* cited by examiner

Primary Examiner—F L Evans
(74) Attorney, Agent, or Firm—Staas & Halsey LLP

(57) ABSTRACT

A mobile code plate manufactured, such as by plastic injection molding, encodes input light by the light path alteration function of a first optical bending portion. This is converted into a first output optical flux by perpendicular incidence and optical transmission at the position of input of a first input optical flux and is then input to a first photodetector element. Since the first optical bending portion arrives at the input position of a second input optical flux, a bent second output optical flux is generated and is likewise input to the first photodetector element. As the mobile code plate rotates, a second optical bending portion arrives at the input position of the first input optical flux. When the first optical bending portion leaves the input position of the second input optical flux, third and fourth output optical fluxes are input to a second photodetector element with the result that an inverted signal is obtained.

15 Claims, 9 Drawing Sheets

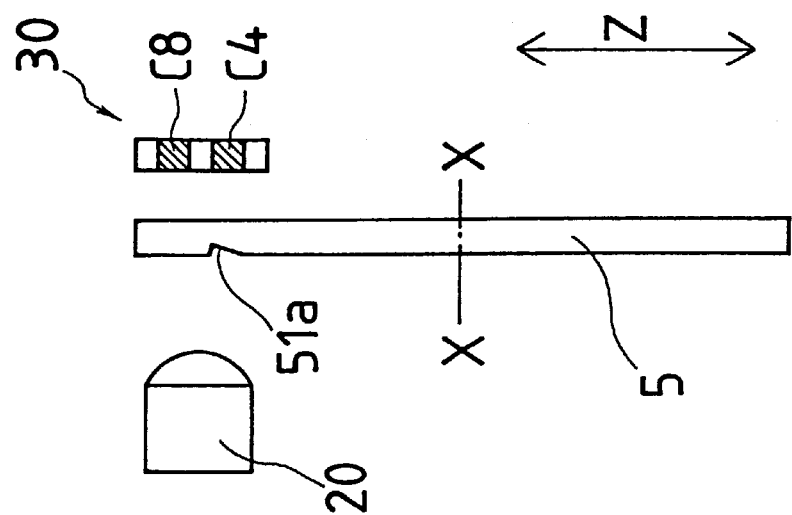
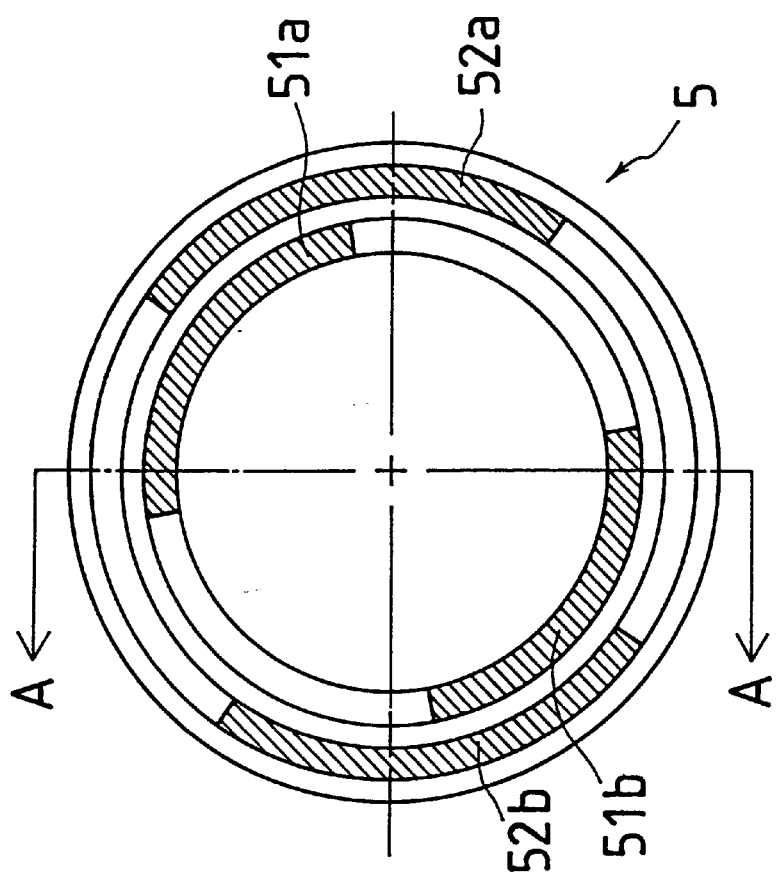

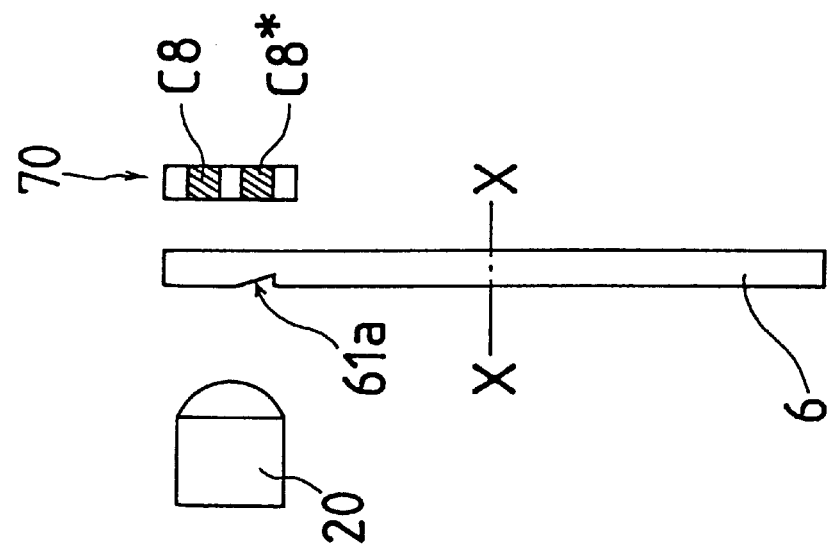
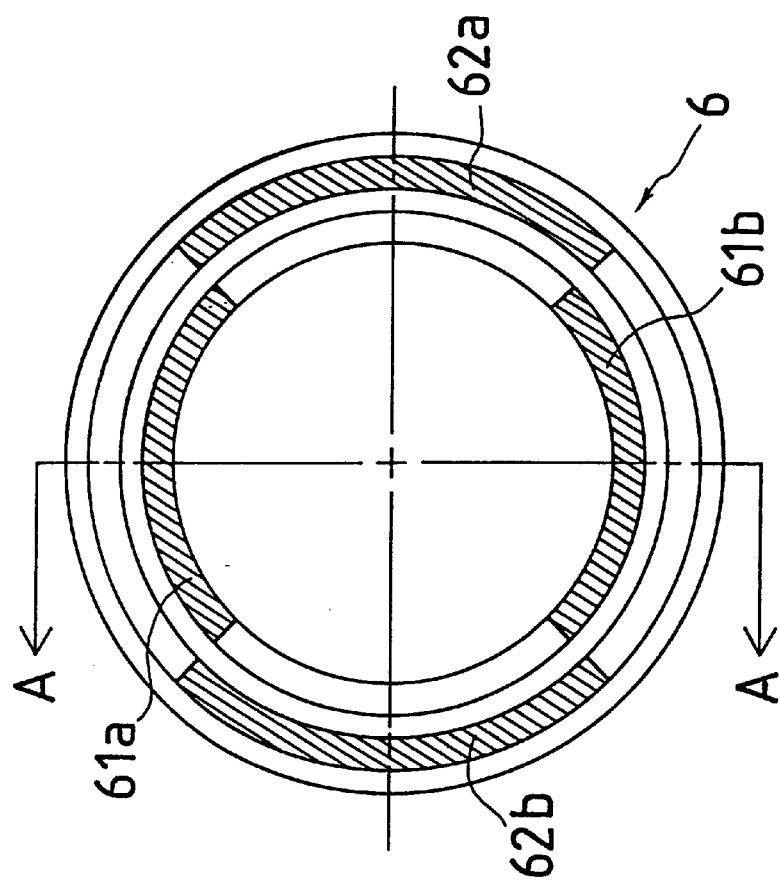

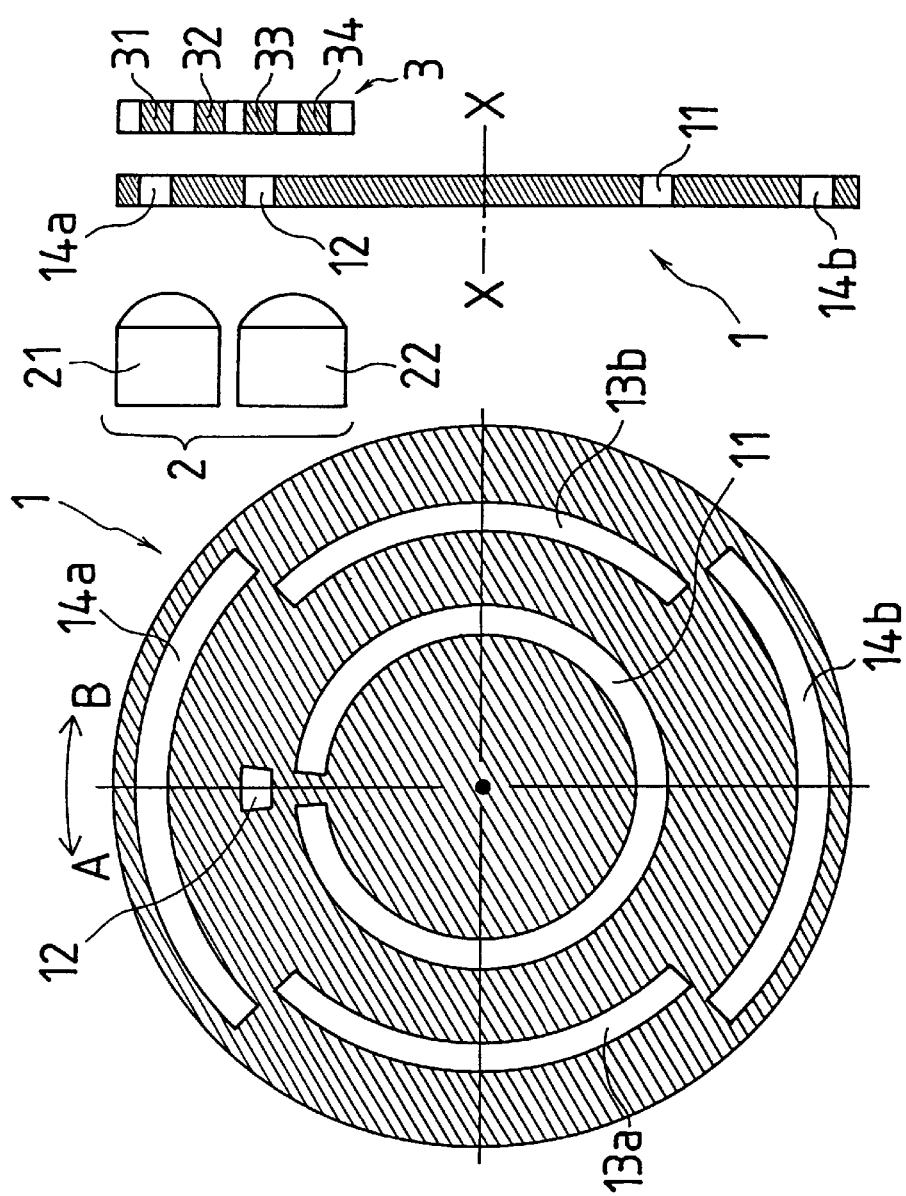

OPTICAL ENCODER

BACKGROUND OF THE INVENTION

1. Field of the Invention

The present invention relates to an optical encoder with an improved construction of the optical detection unit. The present invention may be applied to optical encoders of either the rotary type or linear type.

2. Description of the Related Art

Optical encoders are widely used to detect the position and speed of objects, such as motors, performing rotational movement or translational movement. FIG. 9A–FIG. 9C show an example of a mobile code plate and a photodetector unit constituting the optical detection unit of a rotary optical encoder.

Mobile code plate 1 is produced by evaporating chromium or the like on to a glass plate, then forming transparent sections 11, 12, 13a, 13b, 14a, 14b of concentric arcuate shape by etching. The regions of evaporated film of chromium or the like that are left behind (hatched regions in FIG. 9A) constitute optical screening parts.

A light source unit 2 and photodetector unit 3 are provided on either side of mobile code plate 1. Light source unit 2 and photodetector unit 3 are constituted respectively by the required number of light-emitting elements 21, 22 and photodetector elements 31 to 34.

FIG. 9B shows a cross-sectional view when mobile code plate 1 is in the condition of FIG. 9A; FIG. 9C shows a cross-sectional view when mobile code plate 1 has rotated through 90° from the condition of FIG. 9A in the direction of arrow A.

When transparent parts 11, 12, 13a, 13b, 14a, 14b arrive at a position directly in front of photodetector elements 31 to 34, the light (incoming light) that is directed on to mobile code plate 1 from light emitting elements 21, 22 of light source unit 2 is incident on the corresponding photodetector elements 31 to 34, causing a signal expressing detection of the light to be output. In the condition of FIG. 9B, respective transparent parts 14a, 12 have arrived in positions facing photodetector elements 31, 33, allowing light from light emitting elements 21, 22 to be propagated straight through transparent parts 14a, 12 until it is respectively incident on photodetector elements 31, 33. No transparent part has arrived in the positions facing photodetector elements 32, 34, so light from light emitting elements 21, 22 is screened, and there is no optical input to photodetector elements 32, 34.

In contrast to this, in the condition of FIG. 9C, transparent parts 13b, 11 have respectively arrived in the positions facing photodetector elements 32, 34, so light from light emitting elements 21, 22 is propagated straight through transparent parts 13b, 11 and is respectively incident on photodetector elements 32, 34. No transparent part has arrived in the positions facing photodetector elements 31, 33, so light from light emitting element 21 is screened, and there is no optical input to photodetector elements 31, 33.

When mobile code plate 1 that is mounted on the subject of detection (for example the rotary shaft of a motor) rotates in direction A or in direction B about rotary axis X—X, a photodetection signal is cyclically output from photodetector elements 31~34. The output signals from photodetector elements 31 to 34 are processed by a well-known circuit, not shown, and the rotational position and rotational speed etc. of the subject of detection are thereby detected.

With an optical encoder according to the prior art as described above, it is necessary to form optical screening film such as chromium and remove the optical screening film by performing etching in a prescribed code pattern. Furthermore, since, for the etching, chemicals whose management and processing are troublesome are employed, production costs are high and the method is unsuitable for mass production. A further problem is that, since optical encoding is performed by simple transmission/screening of the light, this inevitably resulted in light being uselessly discarded during screening.

SUMMARY OF THE INVENTION

An object of the present invention is to provide an optical encoder wherein a novel mobile code plate is adopted that does not require the formation of optical screening parts for optical encoding. Also, by this means, the present invention aims to provide an optical encoder that is easy to manufacture and of low cost, with the requirement for metal evaporation or etching etc. being eliminated. Furthermore, the invention aims to provide an optical encoder wherein the rate of utilization of light is excellent, by utilizing the feature that it does not require optical screening parts for the encoding.

According to the present invention, each of strip-shaped regions of a mobile code plate that are scanned by input light during movement is divided into a first type of region and second type of region that generate a first type of output light and a second type of output light having mutually different optical paths, rather than divided into a screening region and a transparent region as conventionally done.

According to a characteristic of the present invention, in order to obtain two types of output light in each strip-shaped region, the optical path of the input light is bent at least once in at least one of the first type of region and second type of region, and an optical path alteration function is provided such as to generate output light having an optical path that does not lie on the plane defined by the direction of the optic axis of the input light and the direction of movement of the mobile code plate at the input position of the input light.

Corresponding to this, at least one of the photodetector elements of the photodetector unit is arranged such that, in a condition in which input light is input to a first type of region a first photodetection condition is realized and, in a condition in which input light is input to the second type of region a second photodetection condition, different from the first photodetection condition, is realized.

According to a first mode of the present invention, at least one of the photodetector elements provided in the photodetection unit is arranged such that it inputs a first type of output light but does not input a second type of output light, and an output signal corresponding to the movement of the mobile code plate is thereby obtained from this photodetector element.

According to a second mode of the present invention, the photodetector unit comprises two or more photodetector elements including a first photodetector element and second photodetector element; a first type of output light is input to the first photodetector element and a second type of output light is input to the second photodetector element; and, from one of the first photodetector element and second photodetector element, an inverted signal with respect to the photodetection signal obtained from the other one is obtained.

According to a third mode of the present invention, the mobile code plate includes two or more strip-shaped regions including a first strip-shaped region and a second strip-shaped region that are scanned by the input light, and the photodetector unit comprises two or more photodetector elements including a first photodetector element and a second photodetector element.

Furthermore, the first type of output light generated by the first strip-shaped region and the second type of output light generated by the second strip-shaped region are simultaneously input to one of the first photodetector element and second photodetector element, and the second type of output light generated by the first strip-shaped region and the first type of output light generated by the second strip-shaped region are simultaneously input to the other of the first photodetector element and second photodetector element, an inverted signal in regard to the photodetection signal obtained from the other being thereby obtained from one of said first photodetector element and said second photodetector element.

The optical path alteration function utilized in the present invention may have several modes.

Also, according to a second mode of the present invention, by means of the optical path alteration function, the photodetector elements that are illuminated by the output light are alternately put into a mutually different first condition and second condition depending on movement of the mobile code plate, such that respective output signals are obtained corresponding to movement of the mobile code plate from the two or more photodetector elements, the output signal obtained from a photodetector element that is illuminated with output light in the second condition being an inverted signal with respect to the output signal obtained from the photodetector element illuminated with output light in the first condition.

Also, according to a third mode of the present invention, by means of the optical path alteration function, the photodetector elements that are illuminated by the output light are alternately put into a mutually different first condition and second condition depending on movement of the mobile code plate, such that respective output signals are obtained corresponding to movement of the mobile code plate from the two or more photodetector elements, the output signal obtained from a photodetector element that is illuminated with output light in the second condition being an inverted signal with respect to the output signal obtained from the photodetector element illuminated with output light in the first condition, the output light in the first condition and the output light in the second condition being generated from light that is input to the mobile code plate through the same input optical path.

As the optical means for achieving the optical path alteration function, for example, apart from means including a flat inclined surface element, there may be employed means including a lens element or totally reflecting surface element formed at the boundary of media of mutually different refractive indices.

Also, as the material of the mobile code plate, plastic etc. obtained by injection molding, as well as optical glass, may be employed.

An optical encoder according to the present invention has the basic characteristic that, instead of encoding based on optical transmission/screening being performed by the mobile code plate, control of the photodetection condition of photodetector elements is performed by utilizing an optical path alteration function. Also, input of two output beams generated from input light incident on the same strip-shaped region to mutually different photodetector elements can be utilized for formation of an inverted signal.

Furthermore, a mutually complementary role is given to two types of output light (first type of output light and second type of output light) respectively generated from input light to two different strip-shaped regions, wherein the first type of output light generated by one of the strip-shaped regions and the second type of output light generated by the other strip-shaped region are input to a single photodetector element, while the second type of output light generated from the one strip-shaped region and the first type of output light generated by the other strip-shaped region are input to another single photodetector element, whereby, from one of these photodetector elements, an inverted signal with respect to the photodetection signal that is obtained from the other photodetector element can be obtained. This mode is advantageous in obtaining an inverted signal in an efficient manner.

BRIEF DESCRIPTION OF THE DRAWINGS

The foregoing and other objects of the invention will become apparent from the following description of preferred embodiments of the invention with respect to the accompanying drawings, in which:

FIG. 1A is a front view of a mobile code plate in an optical encoder according to a first embodiment of the present invention;

FIG. 1B is a cross-sectional view along the line A—A of the mobile code plate of FIG. 1A;

FIG. 4A is a front view of a mobile code plate in a rotary optical encoder according to a third embodiment of the present invention;

FIG. 4B is a cross-sectional view along the line A—A of the mobile code plate of FIG. 4A;

FIG. 9A is a front view of a mobile code plate constituting the optical detection unit of a rotary optical encoder;

FIG. 9B is a cross-sectional view of the mobile code plate of FIG. 9A; and

FIG. 9C is a cross-sectional view when the mobile code plate of FIG. 9A is rotated through 90° in the direction of arrow A from the condition of FIG. 9A.

DESCRIPTION OF THE PREFERRED EMBODIMENTS

An optical encoder according to the present invention is characterized in that optical encoding is performed by utilizing a novel optical path alteration function that is applied to the mobile encoding plate. The present invention may be realized in various embodiments depending on the specific mode of optical path alteration using an optical path alteration function applied to the mobile encoding plate and the construction of the photodetection unit adapted thereto. Various typical embodiments thereof are described below. It should be noted that, although the description of the embodiments is given with reference to drawings illustrating, by way of example, optical encoders of the rotary type, by replacing the mobile code plate by one of a linear shape, the description can be directly applied to an optical encoder of the linear type.

A first embodiment of the present invention is described below with reference to FIG. 1A and FIG. 1B.

Mobile code plate 5 consists of transparent optical glass or plastic and is provided with concentric arcuate optical bending portions 51a, 51b, 52a, 52b as shown by hatching in FIG. 1A. If plastic is employed for the material of mobile code plate 5, mobile code plate 5 can be manufactured by the well-known injection molding technique.

As shown in FIG. 1B, a light source unit consisting of a light emitting element 20 and a photodetector unit 30 are provided on either side of mobile code plate 5. Photodetector unit 30 is provided with two photodetector elements C4, C8. For convenience in description, only those portions of the construction of mobile code plate 5 and photodetector unit 30 corresponding to the C phase are shown.

Optical bending portions 51a, 51b, 52a, 52b are provided divided into two types of strip-shaped regions that are scanned by input light supplied by a light emitting element 20 during movement of mobile code plate 5 (in this case during rotation). These two types of region consist of a direct propagation transparent region (first type of region) which does not have an optical bending capability, and a region (second type of region) that does have an optical bending capability; the latter is indicated as an indentation-shaped flat inclined face (other modes of optical bending portion will be described later).

The optical path alteration function of the optical bending portions and encoding action using this function will be described with reference to FIG. 2A and FIG. 2B.

Figure 2A:
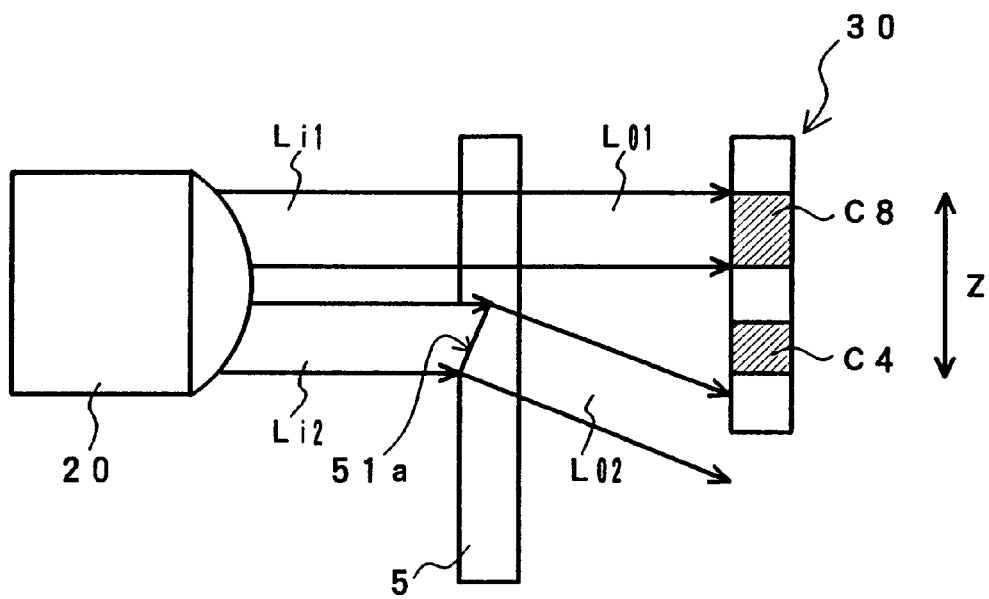
FIG. 2A is a view given in explanation of the optical path alteration function of an optical bending portion and the encoding action using this function in the first embodiment, and illustrates the relationship between the input light and output light and the photodetection condition of the photodetector unit.
Figure 2B:
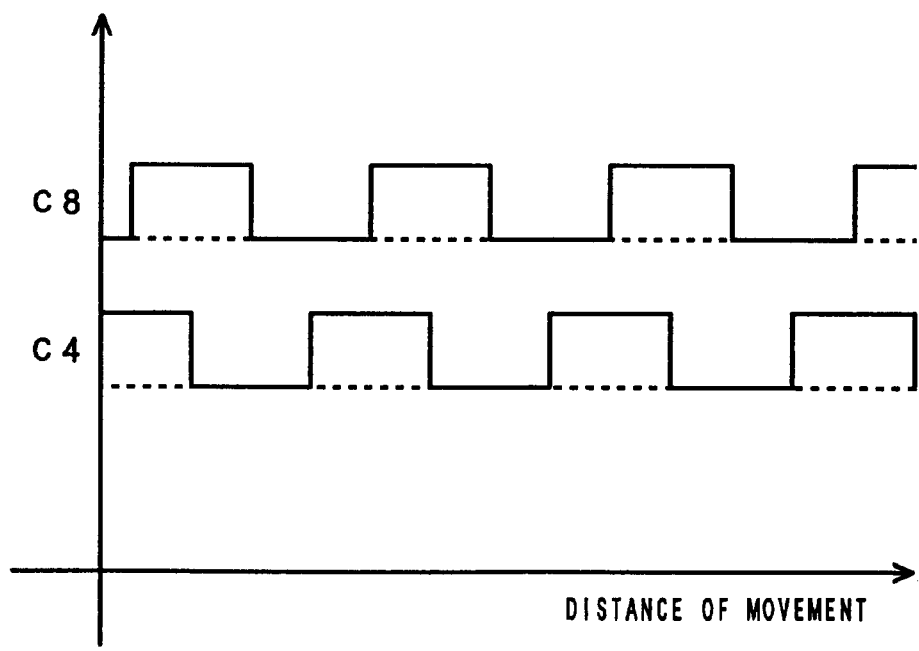
FIG. 2B illustrates the output obtained by a photodetector element in FIG. 2A.

FIG. 2A is a view given in explanation of the optical path alteration function of optical bending portions 51a, 51b, 52a, 52b and the encoding action using this function, and shows the relationship of input light and output light in the condition in FIG. 1A and FIG. 1B and the photodetection condition of the photodetector unit. FIG. 2B shows the output obtained by photodetector elements C4, C8 when mobile code plate 5 rotates about axis X—X (or, executes translational movement, in case of linear type).

The input light that is incident on mobile code plate 5 from light emitting element 20 of the light source unit may be regarded as containing two input optical fluxes Li1 and Li2 corresponding to the position of photodetector elements C8, C4. Since, when mobile code plate 5 is in the condition shown in FIG. 1A, no optical bending portion is formed at the input position of input flux Li1 to mobile code plate 5, input optical flux Li1 is converted to output optical flux Lo1 (first type of output light) via pure perpendicular incidence on to the transparent medium and optical transmission. Output optical flux Lo1 is linearly propagated with the same optic axis as input optical flux Li1, and is incident on to one photodetector element C8 of the C phase.

In contrast, at the position of input of input optical flux Li2 into mobile code plate 5, as shown by the hatching in FIG. 1A, an optical bending portion 51a is formed, so input optical flux Li2 is incident in inclined fashion with respect to the surface of the transparent medium, and so is transmitted after being bent as shown in the FIG. 2A, and is thus converted into output optical flux Lo2 (second type of output light). Output optical flux Lo2 is linearly propagated with an optic axis different from that of input optical flux Li2. Since the other photodetector element C4 of the C phase is arranged on the line of extension of the optic axis, the output optical flux Lo2 whose optical path has been altered is not directed on to photodetector element C4.

It should here be particularly noted that the optical path alteration achieved by the bending action is conducted such as to include components in the direction indicated by arrow Z in FIG. 1B and FIG. 2A. In other words, with mobile code plate 5, the optical path of the input light (input optical flux Li2) is bent at least once, and output light (output optical flux Lo2) is generated such as to have an optical path that does not lie on the plane (perpendicular to the plane of the drawing) that is defined by the direction of the optic axis of the input light and the direction of movement of mobile code plate 5 at the input position of the input light.

As shown in FIG. 1A, since the code pattern is formed by distribution of optical bending portions 51a, 51b, 52a, 52b in concentric arcuate fashion, when mobile code plate 5 rotates about axis X—X (or, in the case of a linear type, executes translational movement), in respect respectively of photodetector elements C4 and C8, an incidence condition and non-incidence condition of the output light are alternately realized. The photodetection output which is obtained as a result is as shown in FIG. 2B.

A second embodiment according to the present invention is described with reference to FIG. 3A and FIG. 3B.

In the second embodiment, a mobile code plate identical with mobile code plate 5 employed in the first embodiment may be used. Where the second embodiment differs from the first embodiment in the arrangement of the photodetector elements in the photodetector unit that detects the output light. FIG. 3A shows the relationship of the input light/output light and the photodetection condition of photodetector unit 10 when, in an arrangement similar to FIG. 2A, mobile code plate 5 is in the same condition as in FIG. 1A and FIG. 1B. Also, FIG. 3B shows, in the same form as in FIG. 2B, the output obtained by photodetector elements C4 and C8 when the mobile code plate 5 has rotated about axis X—X (or, has done translational movement, in case of linear type).

Figure 3A:
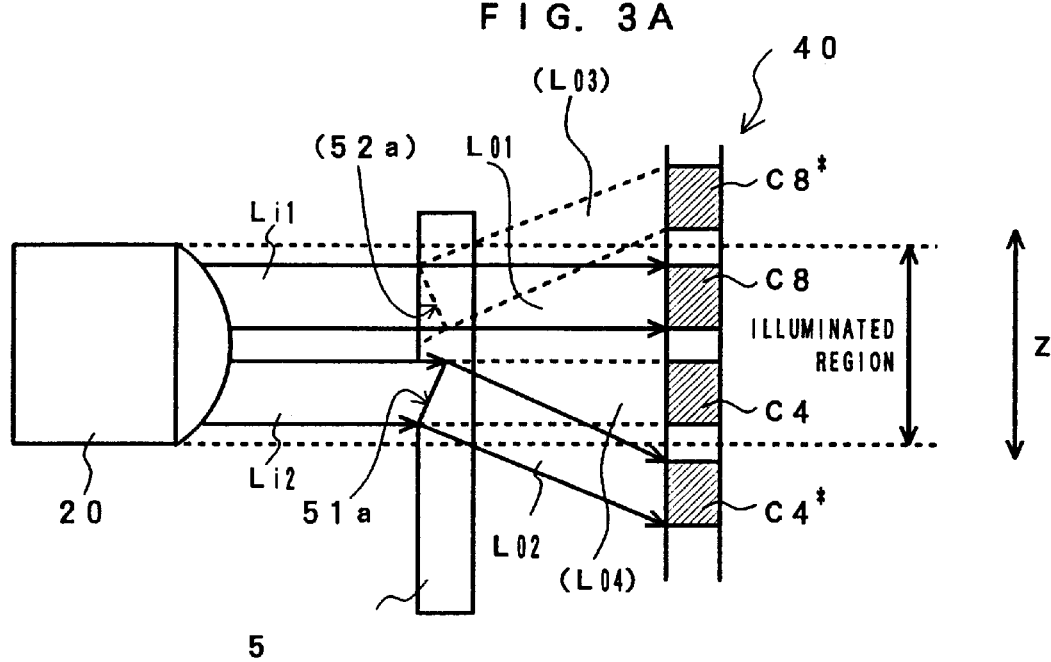
FIG. 3A is a view given in explanation of the optical path alteration function of an optical bending portion and encoding action using this function in an optical encoder according to a second embodiment of the present invention, and illustrates the relationship between the input light and output light and the photodetection condition.

As shown in FIG. 3A, the input light from light emitting element 20 of the light source unit to mobile code plate 5 can be regarded as containing two input optical fluxes Li1, Li2 corresponding to the positions of photodetector elements C8 and C4. Just as in the case of the first embodiment, when mobile code plate 5 moves (in this case, rotates), respective strip-shaped regions are scanned by these input optical fluxes Li1, Li2.

Optical bending portions 51a, 51b, 52a, 52b are arranged so as to divide these strip-shaped regions respectively into two types of regions.

In a condition which is the same as that shown in FIG. 3A and FIG. 1B, since no optical bending portion is formed in the position of input of input optical flux Li1 to mobile code plate 5 (incidence on to the first type of region), the input optical flux Li1 is converted into output optical flux Lo1 (first type of output light) through simple perpendicular incidence on the transparent medium and optical transmission.

Also, since optical bending portion 51a is formed in the input position of input optical flux Li2 to mobile code plate 5 (incidence on to the second type of region), input optical flux Li2 is incident in inclined fashion on to the transparent medium surface, and thus is converted into output optical flux Lo2 (second type of output light) that is transmitted and is propagated in inclined fashion after being bent as shown in FIG. 3A.

Output optical flux Lo1 (first type of output light) that has passed through mobile code plate 5, just as in the case of FIG. 2A is linearly propagated with the same optic axis as that of input optical flux Li1 and is incident on the first photodetector element C8 of the C phase. Since, on the other hand, an optical bending portion 51a is formed at the input position of input optical flux Li2 to mobile code plate 5, input optical flux Li2 is incident in inclined fashion on the surface of the transparent medium, and so is bent as shown in FIG. 3A before being transmitted, being thereby converted into output optical flux Lo2 (second type of output light). Output optical flux Lo2 is linearly propagated with an optic axis different from that of input optical flux Li1.

The chief difference from the first embodiment is that a photodetector element C4* for obtaining an inverted signal with respect to the photodetection signal that is obtained by photodetector element C4 is arranged in parallel with photodetector element C4. Consequently, the output optical flux Lo2 that has been subjected to optical path alteration is input to photodetector element C4* instead of being discarded.

Likewise, a photodetector element C8* for obtaining an inverted signal with respect to the photodetection signal obtained by photodetector element C8 is arranged in parallel with photodetector element C8. Consequently, when the optical bending portion 52a (or 52b) arrives at the input position of input optical flux Li1 as shown by the broken line, output optical flux Lo3 whose optical path has been altered is formed, and is input to photodetector element C8*. If, at this point, the optical bending portion has left the input position of input optical flux Li2, output optical flux Lo4 is formed without being subjected to optical path alteration, and this is then input to photodetector element C4.

Thus, whereas, in the first embodiment, the output light (second type of output light), when its optical path has been altered by operation of the optical path alteration function, is discarded, in the present embodiment, this output light is utilized to generate an output signal of inverted phase, instead of being discarded. The efficiency of utilization of the light can therefore be raised in comparison with the first embodiment.

Just as in the case of the first embodiment, the optical path alteration produced by the bending effect is performed such as to contain the component in the direction indicated by arrow Z in FIG. 3A. Specifically, with mobile code plate 5, on operation of the optical path alteration function, the optical path of the input light (input light flux Li1/Li2) is bent at least once, so that output light (output optical flux Lo2/Lo3) is generated having an optical path that does not lie on the plane (perpendicular to the plane of the drawing) defined by the direction of the optic axis of the input light and the direction of movement of mobile code plate 5 at the input position of the input light.

Since, as in the case of the first embodiment, mobile code plate 5 is formed with a code pattern by distribution in concentric arcuate fashion, when mobile code plate 5 is rotated (or, is made translational movement, in case of linear type), there are alternately realized a condition in which light is incident on photodetector element C4 but is not incident on photodetector element C4* whereby the inverted output is obtained and the contrary condition in which light is not incident on photodetector element C4 but is incident on photodetector element C4* whereby inverted output is obtained.

Likewise, regarding the group of photodetector elements C8, C8*, there are alternately realized a condition in which light is incident on one photodetector element C8 but is not incident on photodetector element C8* whereby inverted output is obtained and the contrary condition in which light is not incident on photodetector element C8 but is incident on photodetector element C8* whereby the inverted output is obtained.

Figure 3B:
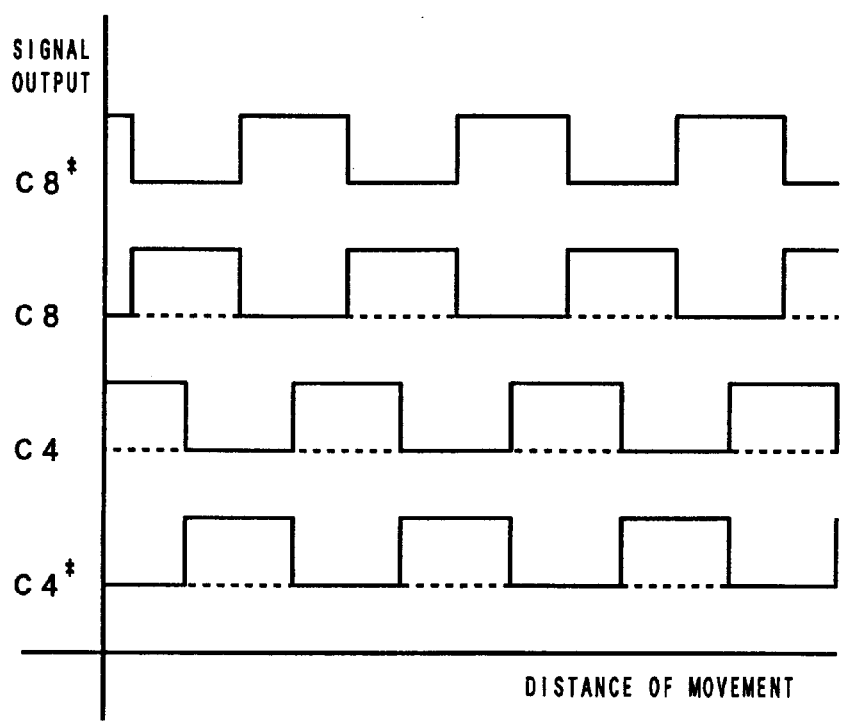
FIG. 3B illustrates the output obtained by a photodetection element of FIG. 3A.

In this embodiment, when mobile code plate 5 is rotated (or, is made translational movement, in case of linear type), photodetection output as shown in FIG. 3B is obtained at photodetector elements C4, C4*, C8 and C8*.

A third embodiment according to the present invention will now be described with reference to FIG. 4A and FIG. 4B.

Mobile code plate 6, just as in the case of the first embodiment, is made of transparent optical glass or plastic. It is formed with concentric arcuate optical bending portions 61a, 61b, 62a, 62b as indicated by hatching. When plastic is employed for the material of mobile code plate 6, mobile code plate 6 may be manufactured by the well-known injection molding technique.

A characteristic feature of the mobile code plate 6 shown in FIG. 4A is the inverted relationship of the code pattern. Specifically, the regions of formation of the group of optical bending portions 61a and 61b and the group of 62a and 62b whereby the code pattern is formed are in mutually inverted relationship. As shown in FIG. 4B, a light source unit comprising a light emitting element 20 and a photodetector unit 70 are provided on either side of mobile code plate 6. Photodetector unit 70 is provided with two photodetector elements C8 and C8*. In accordance with the characteristic feature mentioned above (inverted relationship of the code pattern), photodetector element C8* serves for obtaining a signal that is inverted with respect to C8. For convenience in description, regarding the construction of mobile code plate 6 and photodetector unit 70, in this case also, only the items corresponding to the C phase will be illustrated.

The optical path alteration function of the light bending portions and the encoding action that is thereby performed will be described with reference to FIG. 5A and FIG. 5B.

Optical bending portions 61a, 61b, 62a, 62b indicated by the hatching in FIG. 4A are provided in order to confer an optical path alteration function on mobile code plate 6 and in this case are shown as flat inclined faces of the form of an indentation (other modes of the optical bending portions will be described later).

Figure 5A:
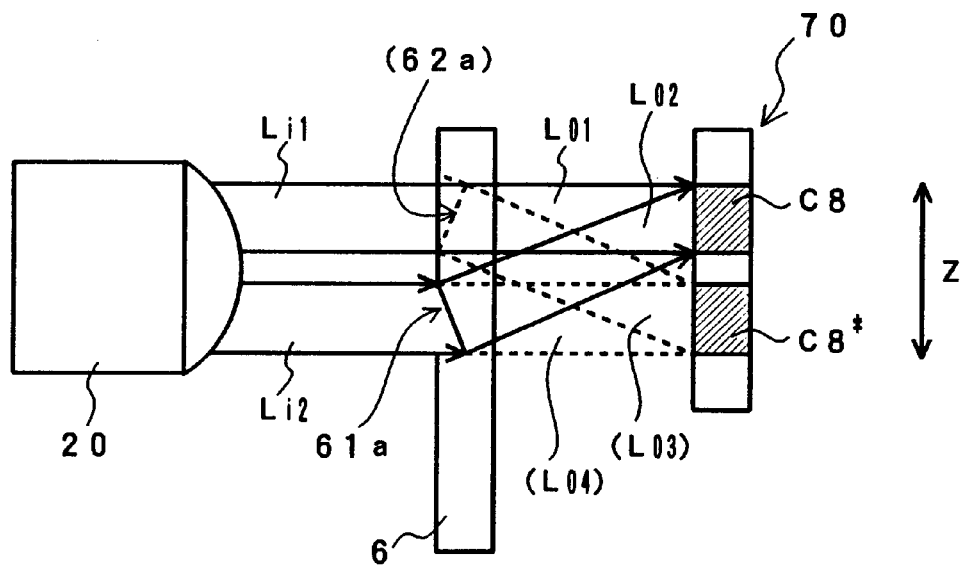
FIG. 5A is a view given in explanation of the optical path alteration function of an optical bending portion and encoding action using this function according to a third embodiment, and illustrates the relationship between input light and output light and the photodetection condition of the photodetection unit.
Figure 5B:
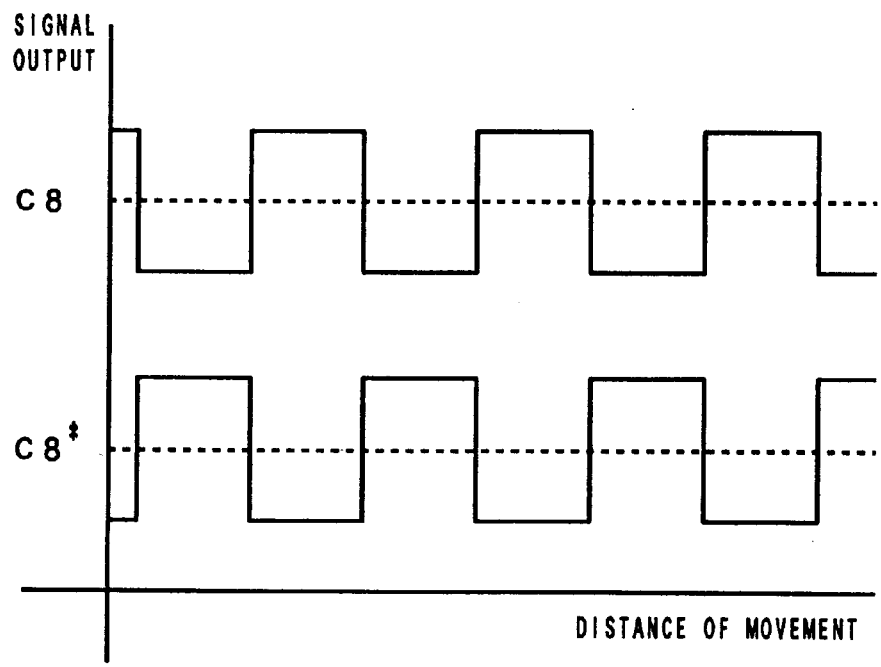
FIG. 5B illustrates the output of the photodetection unit of FIG. 5A.

FIG. 5A and FIG. 5B are views given in explanation of the optical path alteration function of optical bending portions

61a, 61b, 62a, 62b and the encoding action thereof. FIG. 5A shows the relationship between the input light and output light in the conditions shown in FIG. 4A and FIG. 4B and the photodetection condition of the photodetector unit. FIG. 5B shows the output obtained by photodetector elements C8 and C8* when mobile code plate 6 has rotated about the axis X—X (or, has done a translational movement, in case of linear type).

Referring to FIG. 5A, the input light that is incident on mobile code plate 6 from the light emitting element 20 of the light source unit can be regarded as including two input optical fluxes Li1 and Li2 corresponding to the positions of photodetector elements C8 and C8*. Just as in the case of the first and second embodiments, when the mobile code plate 6 moves (in this case, rotates), the respective strip-shaped regions are scanned by these input optical fluxes Li1 and Li2. Optical bending portions 61a, 61b, 62a, 62b are arranged so as to divide these strip-shaped regions respectively into two types of regions.

Since, in the condition shown in FIG. 4A and FIG. 4B, no optical bending portion is formed at the input position of input optical flux Li1 to mobile code plate 6 (incidence to first type of region), by undergoing pure perpendicular incidence on to the transparent medium and optical transmission, input optical flux Li1 is converted to output optical flux Lo1 (first type of output light). Output optical flux Lo1 is linearly propagated with the same optic axis as that of input optical flux Li1, and is incident on to photodetector element C8.

In contrast, since an optical bending portion 61a is formed at the input position of input optical flux Li2 to mobile code plate 6 (incidence to second type of region), input optical flux Li2 is incident in inclined fashion with respect to the surface of the transparent medium, and is bent as shown in the drawing before being transmitted, being thereby converted to output optical flux Lo2 (second type of output light). Output optical flux Lo2 is likewise linearly propagated towards photodetector element C8, with a different optic axis than that of input optical flux Li1.

In this embodiment also, the optical path alteration achieved by the bending action is conducted such as to include the component in the direction indicated by arrow Z in FIG. 5A. In other words, mobile code plate 6 bends the optical path of the input light (input optical flux Li1) at least once, such that output light (output optical flux Lo2) is generated such as to have an optical path that is not on the plane (perpendicular to the plane of the drawing) defined by the optic axis direction of the input light and the direction of movement of mobile code plate 6 at the input position of the input light.

The chief characteristic of this embodiment is that the output optical flux Lo2 when the optical path is altered is directed on to photodetector element C8 that forms a pair (inverted relationship) with the photodetector element C8* on to which it is directed when the optical path is not altered. As a result, in the condition illustrated in the drawings, at photodetector element C8, output optical flux Lo1 and output optical flux Lo2 are superimposed.

Thanks to the formation of the code pattern distributed in concentric arcuate fashion on mobile code plate 6, as shown in FIG. 5A, there are alternately realized a condition in which the two output optical fluxes Lo1 and Lo2 originating from the two input optical fluxes Li1 and Li2 forming the same input optical path are incident on photodetector element C8 but are not incident on photodetector element C8* whereby inverted output is obtained, and a contrary condition in which they are not incident on photodetector element C8 but are incident on photodetector element C8* whereby inverted output is obtained.

In FIG. 5A, the output optical flux in the second condition is indicated by the broken lines labeled by the symbols Lo3, Lo4. Also, in the second condition, optical bending portion 62a (or 62b) indicated by the broken line has arrived at the input position of input optical flux Li1, and optical bending portion 61a (inclined face) has left the input position of input optical flux Li2. Consequently, in this condition, output optical flux Lo3 and output optical flux Lo4 are superimposed at photodetector element C8*.

From the above, in this embodiment, when mobile code plate 6 rotates, or executes translational movement, in case of linear type, photodetection output as shown in FIG. 5B will be obtained from photodetector elements C8 and C8*. In this embodiment also, the efficiency of utilization of the light is raised compared with the first embodiment.

A fourth embodiment according to the present invention will now be described with reference to FIG. 6A and FIG. 6B.

The fourth embodiment corresponds to a modified example of the embodiments described above, its characterizing feature being that, instead of the flat inclined faces shaped as indentations, lens elements are employed for the optical bending portions provided on the mobile code plate for conferring an optical path alteration function. An example is shown in FIG. 6A and FIG. 6B. In each of these examples, a lens element is employed for the optical bending portion 81a (or 91a) of mobile code plate 8.

Figure 6A:
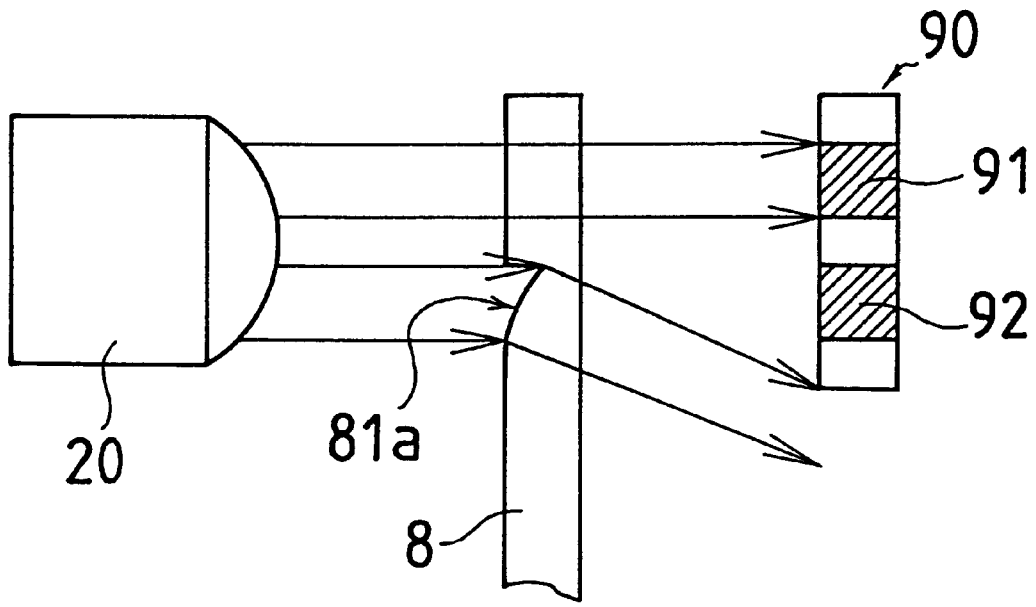
FIG. 6A and FIG. 6B respectively illustrate examples in which lens elements are employed in the optical bending portion of the optical encoder, as a fourth embodiment of the present invention.

In the example shown in FIG. 6A, photodetector elements 91, 92 are provided and, when the optical path alteration function utilizing the lens element is actuated, the input optical flux is converted to an output optical flux having an optical path that is not on the plane (perpendicular to the plane of the drawing) defined by the direction of its optic axis and the direction of movement of mobile code plate 8 at the input position, and so misses the photodetector unit.

Figure 6B:
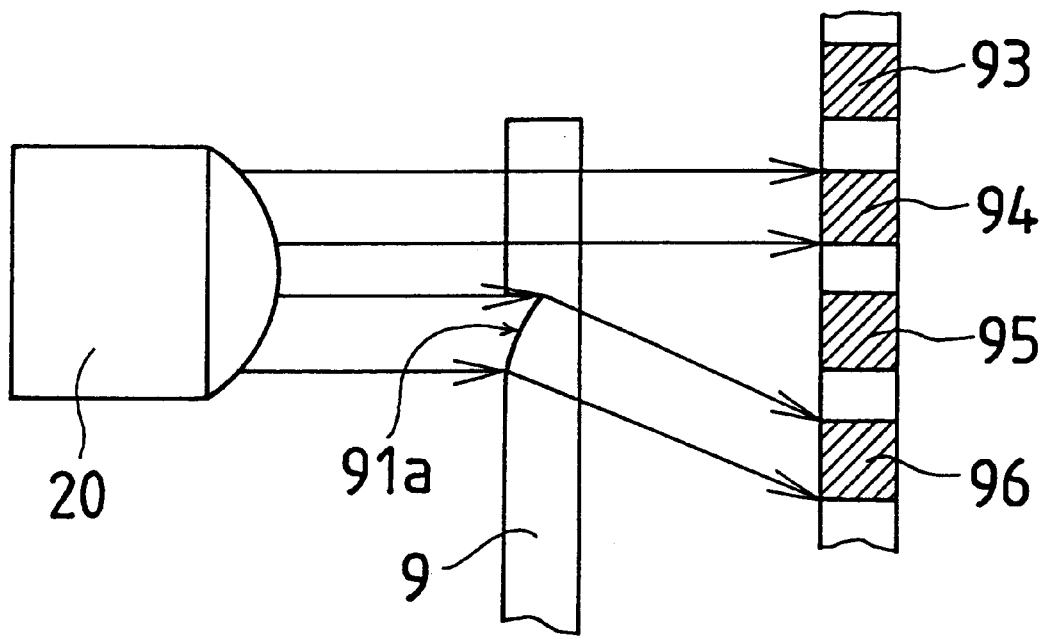

In contrast, in the example shown in FIG. 6B, photodetector elements 93, 94, 95, 96 are provided. Photodetector elements 93 and 94, and 95 and 96 normally constitute respective pairs, forming an inverted relationship.

When the optical path alteration function is actuated, the input optical flux is converted to output optical flux having an optical path that is not on the plane (perpendicular to the plane of the drawing) defined by its optic axis direction and the direction of movement of mobile code plate 9 at the input position, and is thus directed on to the other one of the mutually paired photodetector elements.

The fifth embodiment according to the present invention will now be described with reference to FIG. 7A and FIG. 7B.

The fifth embodiment also corresponds to a modified example in respect of the embodiments described above, its characterizing feature being that totally reflecting surface elements are employed as the optical bending portions provided for conferring an optical path alteration function on the mobile code plate. FIG. 7A and FIG. 7B illustrate an example thereof.

In both cases, two totally reflecting surfaces 101, 102 are formed to serve as the optical bending portions (one only shown by way of example) of mobile code plate 100. Such totally reflecting surfaces 101, 102 can be obtained by forming inclined faces, as shown in the drawings, by utilizing the difference of refractive index of mobile code plate 100 (for example if this is of acrylic resin, its refractive index=about 1.5) and air (refractive index=1.0). A mobile code plate 100 having such inclined faces can easily be manufactured as for example a plastic injection molding.

Figure 7A:
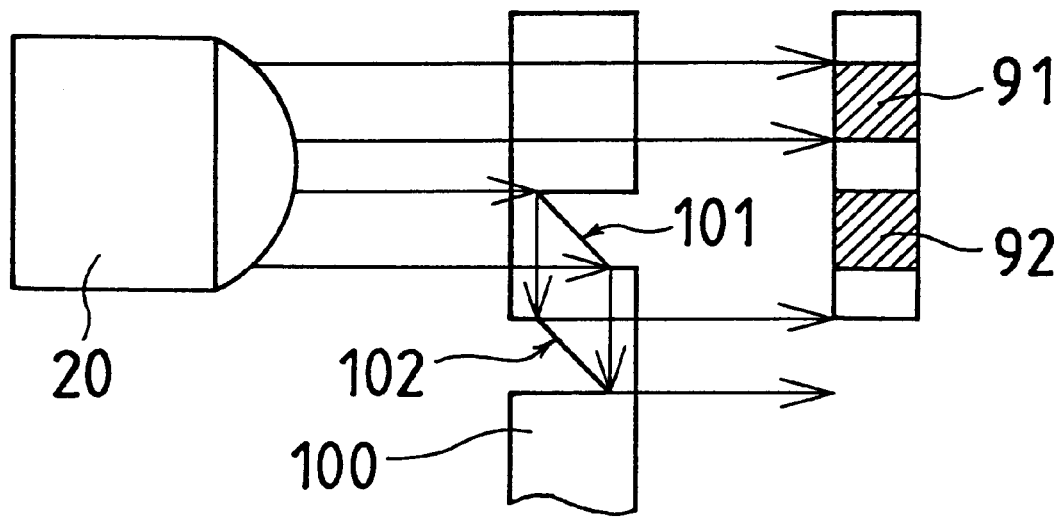
FIG. 7A and FIG. 7B respectively illustrate examples in which totally reflecting planar elements are employed as the optical bending portion of an optical encoder as a fifth embodiment of the present invention.

In the example illustrated in FIG. 7A, photodetector elements 91, 92 are provided and, when the optical path alteration function utilizing totally reflecting surface elements 101, 102 is actuated, the input optical flux is converted into output optical flux having an optical path that does not lie on the plane (perpendicular to the plane of the drawing) defined by the direction of its optic axis and the direction of movement of mobile code plate 100 at the input position, and thus misses the photodetector unit.

Figure 7B:
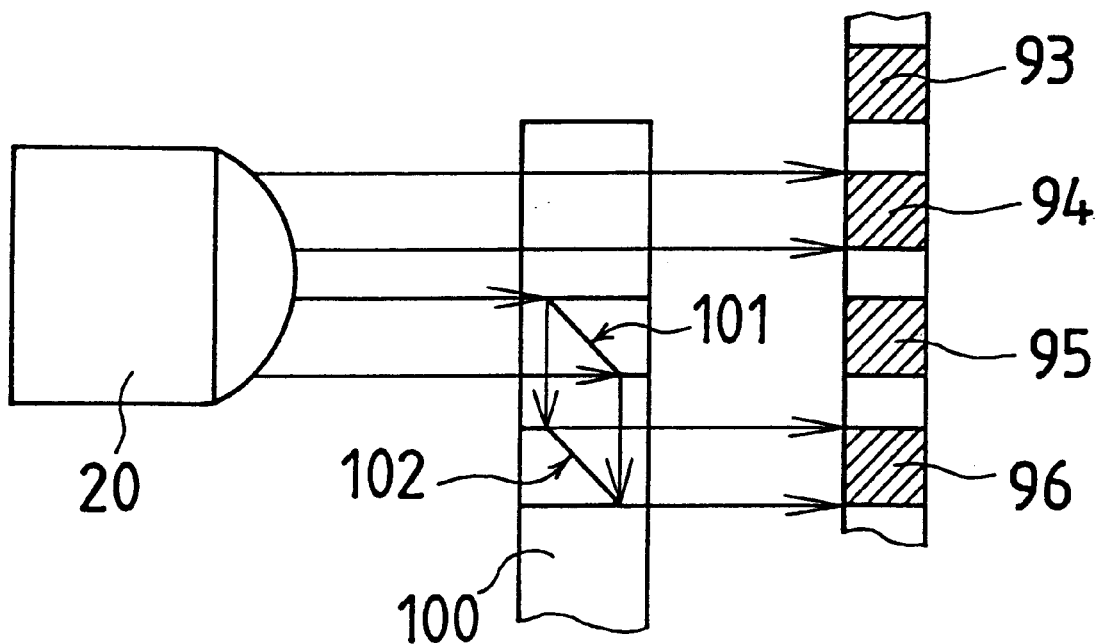

In contrast, in the example shown in FIG. 7B, photodetector elements 93, 94, 95, 96 are provided. Photodetector elements 93 and 94, and 95 and 96 normally constitute respective pairs, forming an inverted relationship.

When the optical path alteration function is actuated, input optical flux is converted into output optical flux having an optical path that does not lie on the plane (perpendicular to the plane of the drawing) defined by the direction of its optic axis and the direction of movement of mobile code plate 100 at the input position, and so is incident on the other one of the photodetector elements forming a pair.

A sixth embodiment of the present invention is described below with reference to FIG. 8.

The sixth embodiment corresponds to a further modification of the fifth embodiment described above. In this embodiment, totally reflecting surface elements are employed for the optical bending portions provided for conferring an optical path alteration function on the mobile code plate, and the optical flux corresponding to the output light is allowed to escape by propagation through the interior of the mobile code plate itself. FIG. 8 shows an example of this embodiment.

In this example also, a single totally reflecting surface 201 is formed on mobile code plate 200. Such a totally reflecting surface 201 can be obtained by formation of an inclined face on the back face as shown in FIG. 8, utilizing the difference of refractive index of mobile code plate 200 (for example in the case of acrylic resin the refractive index=about 1.5) and air (refractive index=1.0). A mobile code plate 200 having such an inclined face can easily be manufactured as for example a plastic injection molding.

Figure 8:
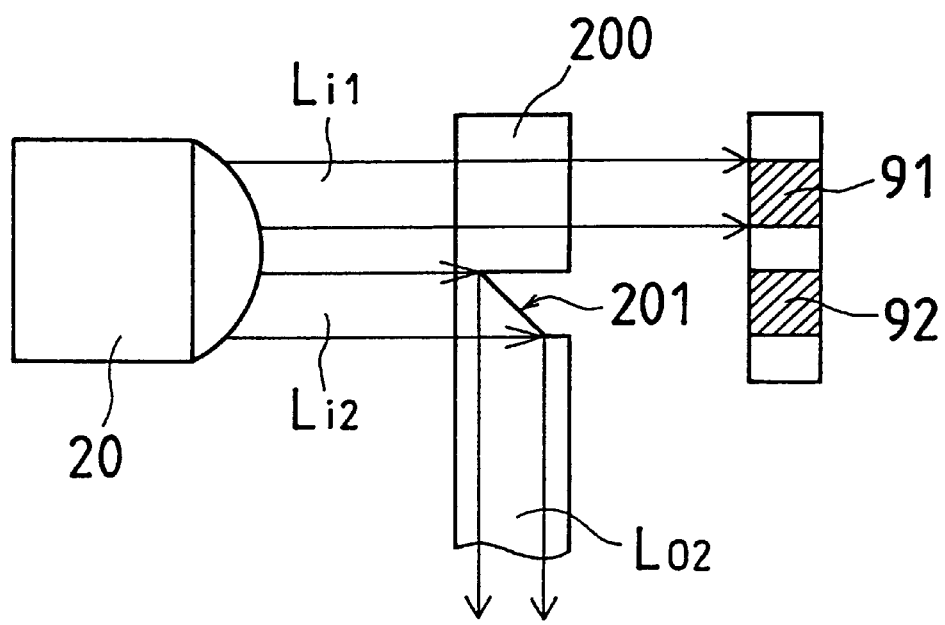
FIG. 8 illustrates a further example in which a totally reflecting planar element is employed as an optical bending portion as a sixth embodiment of the present invention.

In the example shown in FIG. 8, there are provided photodetector elements 91, 92, and the entire amount of optical flux Li2 that is incident on the portion that acts to provide an optical path alteration function utilizing totally reflecting surface element 201 undergoes internal reflection at totally reflecting surface 201, being thus converted to optical flux Lo2 that is propagated through the interior. If this optical flux Lo2 is regarded as the output optical flux, in this case also, output optical flux is generated having an optical path that does not lie on the plane (perpendicular to the plane of the drawing) defined by the direction of movement of mobile code plate 200 at the input position and the direction of the optic axis.

In the above, embodiments were described in which a linear propagation transmission region was formed as a first type of region defined by the region scanned by the input light and a region (hatched portion in FIG. 1A, FIG. 4A and FIG. 9A) having an optical path alteration function was formed as the second type of region, but the roles of these two could be interchanged. For example, instead of conferring the optical path alteration function on the hatched portion in FIG. 1A, FIG. 4A and FIG. 9A, an optical path alteration function may be conferred on the remaining portion (unhatched portion) to be scanned by the same input light, and the necessary alterations of arrangement of the photodetector elements corresponding thereto may be made.

Also, although, described above are embodiments in which the optical path alteration function was conferred on only one of the first type of region and second type of region, this was because of taking into account design advantages such as the fact that using one of the first type of region and second type of region as the region through which the input light is linearly propagated and transmitted enables the construction of the mobile code plate to be simplified, or the fact that it enables arrangement of the photodetector elements on the line of extension of the optical path of the input light.

That is, the basic characteristic of the present invention lies in the optical path of the input light being bent at least once and optical coding being performed utilizing regions provided with an optical path alteration function whereby output light is generated having an optical path that does not lie on the plane defined by the optic axis direction of the input light and the direction of movement of the mobile code plate at the input position of the input light, and clearly does not exclude the provision of an optical path alteration function on both the first type of region and second type of region obtained by dividing a region scanned by the same input light.

According to the present invention, in place of the prior art optical encoder, in which a mobile code plate is employed formed with a code pattern with screening portions and transparent portions produced by using etching, an optical encoder is provided using a mobile code plate of a straightforward construction and which is easy to manufacture and of low cost. In particular, it has the advantage that the mobile code plate can be manufactured as a plastic molding. Also, since optical screening portions are not required for the optical encoding, an optical encoder can easily be constructed in a configuration in which the light of the light emitting elements is more efficiently utilized than conventionally; for example it is possible to raise the signal output by a factor of 2 for the same current consumption.

What is claimed is:

1. An optical encoder, comprising:
    a mobile code plate to convert input light into encoded output light;
    a light source unit to scan one or more arcuate strip-shaped regions on said mobile code plate with said input light during movement of said mobile code plate; and
    a photodetector unit to detect said output light that has been encoded by said mobile code plate,
    wherein at least two of said arcuate strip-shaped regions are scanned by said input light to generate at least two types of output light having mutually different optical paths, in order to perform said encoding, and
    in at least one of said at least two arcuate strip-shaped regions an optical path alteration means is provided such as to generate output light having an optical path that does not lie in an axial direction of an optic axis of said input light nor in a rotational direction of movement of said mobile code plate.

2. The optical encoder according to claim 1, wherein at least one photodetector element provided in said photodetection unit is arranged such that said photodetector unit inputs said first type of output light but does not input said second type of output light.

3. The optical encoder according to claim 1, wherein said photodetector unit comprises at least a first photodetector element and an second photodetector element, with said first type of output light being input to said first photodetector element and said second type of output light being input to said second photodetector element, and obtains from one of said first photodetector element and said second photodetector element an inverted signal with respect to the photodetection signal obtained from the other one.

4. The optical encoder according to claim 1, wherein said optical path alteration function is achieved by an optical unit including a flat inclined surface element.

5. The optical encoder according to claim 1, wherein said optical path alteration function is achieved by an optical unit including a lens element.

6. The optical encoder according to claim 1, wherein said optical path alteration function is achieved by an optical unit including a totally reflecting surface element formed at the boundary of media of mutually different refractive indices.

7. The optical encoder according to any one of claim 1, wherein said mobile code plate is formed of optical glass.

8. The optical encoder according to any one of claim 1, wherein said mobile code plate is formed of a product of plastic injection molding.

9. An optical encoder, comprising:
   a mobile code plate to convert input light into encoded output light:
   a light source unit to scan one or more strip-shaped regions on said mobile code plate with said input light during movement of said mobile code plate; and
   a photodetector unit to detect said output light that has been encoded by said mobile code plate,
   wherein at least two of said strip-shaped regions are scanned by said input light to generate at least two tapes of output light having mutually different optical paths, in order to perform said encoding,
   wherein in at least one of said at least two strip-shaped regions an optical path alteration means is provided such as to generate output light having an optical path that does not lie on a plane defined by a direction of an optic axis of said input light and the direction of movement of said mobile code plate at the position of input of said input light, and
   wherein said at least two strip-shaped regions includes a first strip-shaped region and a second strip-shaped region that are scanned by the input light; and said photodetector unit including at least a first photodetector element and a second photodetector element with said first type of output light generated by said first strip-shaped region and said second type of output light generated by said second strip-shaped region being simultaneously input to one of said first photodetector element and said second photodetector element with the second type of output light generated by said first strip-shaped region and said first type of output light generated by the second strip-shaped region being simultaneously input to the other of said first photodetector element and said second photodetector element, and obtaining from one of said first photodetector element and said second photodetector element, an inverted signal in regard to the photodetection signal obtained from the other.

10. The optical encoder according to claim 9, wherein said optical path alteration function is achieved by an optical unit including a flat inclined surface element.

11. The optical encoder according to claim 9, wherein said optical path alteration function is achieved by an optical unit including a lens element.

12. The optical encoder according to claim 9, wherein said optical path alteration function is achieved by an optical unit including a totally reflecting surface element formed at the boundary of media of mutually different refractive indices.

13. The optical encoder according to claim 9, wherein said mobile code plate is formed of optical glass.

14. The optical encoder according to claim 9, wherein said mobile code plate is formed of a product of plastic injection molding.

15. An optical encoder, comprising:
   a light source;
   a mobile code plate having at least two arcuate strip-shaped regions; and
   a photodetector to detect light radiating from the light source and through the mobile code plate and through at least one of the at least two arcuate strip-shaped regions,
   wherein a first one of the at least two arcuate strip-shaped regions alters the transmission path of the radiating light to have a different optical path compared to light radiating through a second one of the at least two arcuate strip-shaped regions, with the altered optical path not laying in an axial direction of the optic axis of the input light or in a rotational direction of movement of the mobile code plate.

* * * * *

UNITED STATES PATENT AND TRADEMARK OFFICE
CERTIFICATE OF CORRECTION

PATENT NO.     : 6,222,183 B1
DATED          : April 24, 2001
INVENTOR(S)    : Mitsuyuki Taniguchi, et al.

It is certified that error appears in the above-identified patent and that said Letters Patent is hereby corrected as shown below:

Title page:
Change F L Evans to -- F. L. Evans --.

Column 2,
Line 19, change "wherein" to -- where --
Line 56, insert -- a -- after "and".

Column 7,
Line 6, change "Fig 3A" to -- Fig. 1A --.

Column 13,
Line 27, change ":" to -- ; --.

Column 14,
Line 1, insert -- , -- after "element" (second occurrence).
Line 6, insert -- , -- after "element" (second occurrence).

Signed and Sealed this

Twenty-fifth Day of September, 2001

Attest:

*Nicholas P. Godici*

NICHOLAS P. GODICI
*Attesting Officer*   *Acting Director of the United States Patent and Trademark Office*